Sept. 4, 1956  E. B. REED  2,761,329
RESILIENTLY SUPPORTED HEEL REST
Filed Oct. 22, 1954
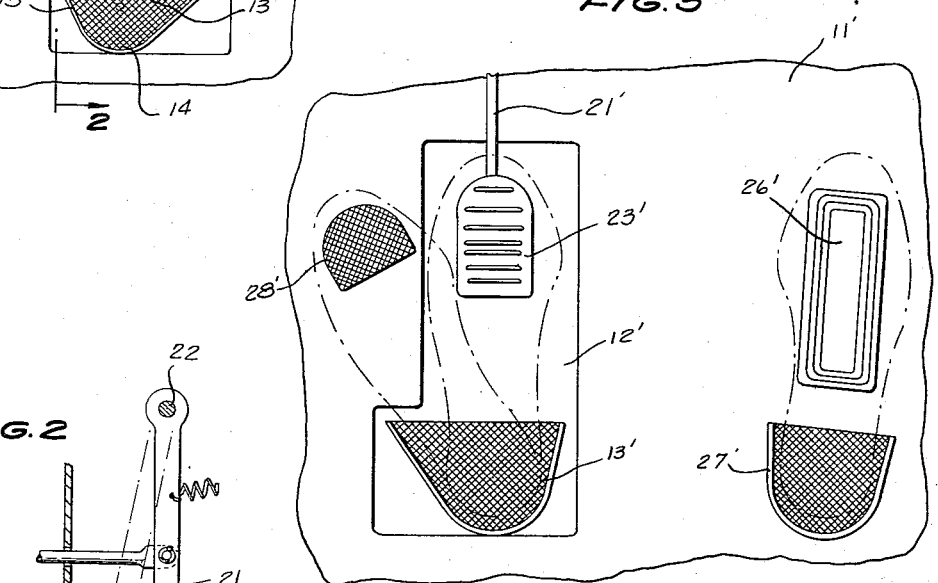
INVENTOR.
EUGENE B. REED
BY
McMorrow, Berman + Davidson
ATTORNEYS

United States Patent Office 2,761,329
Patented Sept. 4, 1956

2,761,329

RESILIENTLY SUPPORTED HEEL REST

Eugene B. Reed, Jefferson City, Mo.

Application October 22, 1954, Serial No. 463,983

2 Claims. (Cl. 74—564)

This invention relates to motor vehicles, and more particularly to an improved brake pedal arrangement for a motor vehicle.

A main object of the invention is to provide a novel and improved brake pedal arrangement for a motor vehicle which involves simple components, which substantially reduces the time period required for an operator to apply the brake pedal, and which assures quicker stopping of a motor vehicle with less effort than in the brake pedal arrangements previously employed.

A further object of the invention is to provide an improved brake pedal and floor board construction for a motor vehicle, said construction providing a comfortable position for the operator's foot, reducing the amount of movement required in applying the brake pedal of the vehicle, enabling the brake pedal to be easily operated, assuring a quicker stop of the vehicle, and reducing the possibilities of accidents by minimizing the possibility of the operator catching his foot or shoe on a portion of the brake pedal.

Further objects and advantages of the invention will become apparent from the following description and claims, and from the accompanying drawings, wherein:

Figure 1 is a fragmentary top plan view of a portion of the floor board of a motor vehicle provided with an improved brake pedal arrangement according to the present invention, showing a common support for the operator's foot enabling the operator to actuate either the accelerator pedal or the brake pedal of the vehicle.

Figure 2 is a vertical cross sectional view taken on the line 2—2 of Figure 1.

Figure 3 is a fragmentary top plan view of a portion of the floor board of a motor vehicle of the type having a left foot brake pedal and employing an improved brake pedal arrangement according to the present invention.

Referring to the drawings, and more particularly to Figures 1 and 2, 11 designates the floor board of the motor vehicle, said floor board being formed with a generally L-shaped recess 12 adjacent the steering post 10. Designated at 13 is a heel-receiving member which is located in the lower rear portion of the recess 12, as shown in Figure 2, said heel-receiving member comprising a generally triangular plate having a rounded lower corner 14 and being provided with an upstanding peripheral flange 15 extending continuously along the lower sides of the plate member, as viewed in Figure 1. The heel-receiving member 13 is centrally supported on an arcuate rod 16 rigidly secured to its bottom surface and extending slidably through the bottom wall 17 of the recess 12, a coiled spring 18 being provided on the arcuate rod 16 to resiliently support the heel-receiving member 13 in a position substantially coplanar with the floor board 11. The heel-receiving member 13 is hinged at 19 to the rear wall of the recess 12 to allow the heel-receiving member 13 to pivot, said heel-receiving member being biased to a position substantially level with the floor board 11 by the spring 18, as above described.

The arcuate rod 16 is provided on its bottom end with an enlarged foot element 20 which is engageable against the bottom wall 17 of recess 12 to limit upward movement of the heel-supporting member 13.

Designated at 21 is the brake lever which is pivoted to the vehicle at 22 and which extends downwardly into the recess 12, the lever 21 being provided with the downwardly and rearwardly bent lower portion 22 on which is secured the brake pedal element 23. As shown in Figure 2, the pedal element 23 is normally located in the recess 12 just below the plane of the floor board 11, and is arranged forwardly adjacent to the heel-receiving member 13 so that the operator may readily depress the brake pedal 23 with his heel resting in the heel-receiving member 13. As shown in Figure 2, the brake lever 21 may thus be swung from its normal full line position to the dotted view position thereof shown in Figure 2, to apply the vehicle brakes.

Designated at 24 is the vehicle accelerator lever, said accelerator lever being located adjacent the brake lever 21 and being provided with the end portion 25 which is inclined toward the heel-receiving member 13, the accelerator lever portion 25 having secured thereon the accelerator pedal element 26 which is located substantially in side by side relation with the brake pedal element 23. As shown in Figure 1, the triangular shape of the heel-receiving member 13 is such that the operator's foot may normally engage the accelerator pedal 26 and may be quickly and easily pivoted on the heel-receiving member 13 to move the sole of the operator's foot from the accelerator pedal element 26 to the brake pedal element 23 when it is desired to apply the vehicle brakes. Since the brake pedal element 23 is normally disposed just below the plane of the floor board, there is no possibility of catching the operator's shoe on the brake pedal element and thus interfering with the intended application of the vehicle brakes.

Because it is possible to rapidly make the transition from acceleration to braking, by merely pivoting the foot in the manner above described, valuable time is saved in applying the brakes, since it is merely necessary for the driver to pivot his foot sideways from the accelerator pedal to the brake pedal and then press the brake pedal. Since minimum time is required to apply the brakes, a minimum distance will be traveled by the vehicle during the transition from acceleration to braking and the safety and ease of application of the brakes will be substantially increased, as over that available with the brake arrangement previously employed. Furthermore, since it is not necessary for the operator to lift his foot to change over from acceleration to braking, driving fatigue is substantially reduced and the operator's comfort is thus considerably increased.

Referring now to the form of the invention illustrated in Figure 3, 11' designates the floor board of a motor vehicle of the type employing a brake pedal arranged for a left foot operation. The floor board 11' has a conventional accelerator pedal element 26' arranged forwardly adjacent a heel supporting member 27', for receiving the heel of the operator's right foot to enable the accelerator pedal 26' to be controlled by said right foot. The floor board 11' is provided with a recess 12' into which extends the lower portion of the depending brake lever 21', said lower portion having secured thereon the brake pedal element 23'. Resiliently mounted in the lower portion of the recess 12' in the same manner as in Figure 1 is the heel-receiving member 13', said heel-receiving member 13' being generally similar to the heel-receiving member 13 of Figure 1 but being reversed in shape, whereby the operator's left foot may pivot from a position engaging a stationary toe rest 28' mounted on the floor board 11' at the left side of the recess 12' to a position engaging the brake pedal element 23', which is normally arranged just below the plane of the floor board 11'. Thus, the operator may pivot his left foot rapidly from a position engaging the toe rest 28' to a position engaging the brake pedal element 23' and quickly depress the brake pedal element 23', obtaining the same rapid application of the vehicle brakes as is obtainable from the arrangement illustrated in Figures 1 and 2.

While certain specific embodiments of an improved floor board and brake pedal arrangement for motor vehicles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having a floor board and a recessed portion in said floor board, a depressible heel rest structure comprising a heel-receiving member in said recessed portion, means hingedly connecting the rear end of said heel receiving member to the rear wall of said recessed portion, a depending arcuate rod rigidly secured to said heel-receiving member and extending slidably through the bottom wall of said recessed portion, said rod being arcuately curved upwardly and rearwardly from the bottom wall of said recessed portion, spring means disposed between said heel-receiving member and said floor board recessed portion and yieldably suporting said heel-receiving member in a normal position substantially flush with said floor board, means on the lower end of the rod engaging the underside of the bottom wall of the recessed portion to limit upward movement of said heel-receiving member, said heel-receiving member having upstanding side walls arranged at a relatively wide angle to each other to allow wide pivoting of the heel of the operator's foot therein.

2. In a motor vehicle having a floor board and a recessed portion in said floor board, a depressible rest structure comprising a heel-receiving member in said recessed portion, a depending arcuate rod rigidly secured to the bottom of said heel-receiving member and extending slidably through the bottom wall of said recessed portion, said rod being arcuately curved upwardly and rearwardly from the bottom wall of said recessed portion, a coiled spring surrounding said rod and disposed between said heel-receiving member and said floor board recessed portion, yieldably supporting said heel-receiving member and biasing said heel-receiving member upwardly, means hingedly connecting the rear end of said heel-receiving member to the rear wall of said recessed portion, an enlarged foot element on the lower end of said rod and being engageable with said recessed portion to limit upward movement of said heel-receiving member to a position normally substantially flush with said floor board, said heel-receiving member having upstanding side walls arranged at a relatively wide angle to each other to allow wide pivoting of the heel of the operator's foot therein.

References Cited in the file of this patent

UNITED STATES PATENTS

| | | |
|---|---|---|
| 850,507 | Waldon | Apr. 16, 1907 |
| 1,162,959 | West | Dec. 7, 1915 |
| 1,418,968 | Philipps | June 6, 1922 |
| 1,629,381 | Hill | May 17, 1927 |
| 1,802,864 | Bashara | Apr. 28, 1931 |
| 2,062,114 | Bashara | Nov. 24, 1936 |
| 2,152,543 | Feilcke | Mar. 28, 1939 |
| 2,199,963 | Romberger | May 7, 1940 |
| 2,281,117 | Sladky | Apr. 28, 1942 |

FOREIGN PATENTS

| | | |
|---|---|---|
| 5,608 1914 | Great Britain | Feb. 25, 1915 |